United States Patent [19]
Verhart

[11] 3,722,531
[45] Mar. 27, 1973

[54] ELECTRO MAGNETIC VALVE

[75] Inventor: Willem Jan Verhart, Prov. N-Holland, Netherlands

[73] Assignee: Martonair Limited, Twickenham, England

[22] Filed: Jan. 27, 1972

[21] Appl. No.: 221,355

[30] Foreign Application Priority Data

Mar. 23, 1971 Netherlands .......................7103843

[52] U.S. Cl. ...............................................137/271
[51] Int. Cl. .............................................F16k 11/00
[58] Field of Search....137/271, 269, 625.65, 625.64; 251/129

[56] References Cited

UNITED STATES PATENTS

| | | |
|---|---|---|
| 3,323,547 | 6/1967 | Van Husen, Jr. et al. ........137/269 X |
| 3,407,834 | 10/1968 | Brandenberg.......................137/271 |
| 3,487,848 | 1/1970 | Leibfritz et al. ......................137/271 |

Primary Examiner—Henry T. Klinksiek
Assistant Examiner—Robert J. Miller
Attorney—John A. Mawhinney

[57] ABSTRACT

A valve including a housing defining a chamber having an outlet for delivering a pressurized fluid supply or transmitting a fluid pressure signal to an external position. The chamber is connected with two ports in a wall of the housing alternatively opened and closed electromagnetically. A plate abuts the housing wall and has an inlet and exhaust ports therein. A gasket is positioned between the plate and the housing wall and has apertures therein by which each of the ports in the housing wall is connected with one or other of the ports in the plate, the apertures in the gasket being so arranged that the connections between the ports in the housing wall and the plate respectively are interchangeable by inverting the gasket.

6 Claims, 7 Drawing Figures

ELECTRO MAGNETIC VALVE

The invention relates to an electromagnetic valve of the type (hereinafter called the type described) comprising a housing defining a chamber permanently connected with an outlet for delivering a pressurized fluid supply or transmitting a fluid pressure signal to an external position, the chamber also being connected with two ports in a wall of the housing through passages arranged to be alternatively opened and closed by an electro-magnet positioned within the housing, a plate abutting said wall of the housing and having an inlet and an exhaust port therein and a gasket positioned between the plate and said wall of the housing and having a plurality of apertures therein by which each of the ports in the housing is connected with one or other of the ports in the plate.

Known electromagnetic valves of the type described have a number of disadvantages. The most important disadvantage is that depending on the original design of such a valve the outlet port of the valve leading to the external position is either always closed or always opened by energizing the electro-magnet. It is often desirable to invert the function of a valve being part of pneumatic circuit. This can only be done by exchanging the valve with a different valve being designed for the opposite function, which is expensive.

Another important disadvantage lies in the fact that the known valves of the type described are operated with alternating current and therefore have to be fitted with a short-circulating ring for damping the vibrations in the stationary magnet pole caused by the alternating magnetic fields. When the electro-magnet is energized it is necessary that a good metallic contact is made between the armature of the electro-magnet and the short circuiting ring. Any unevenness or dirtiness of the surfaces of these parts will cause the armature to vibrate resulting in an audible buzzing noise. A further disadvantage is that because of the air gaps in the magnetic circuit a relatively large amount of energy is consumed causing a high production of heat. Moreover coils of electro-magnets operated with alternating current have a strong energizing transient which may be twice the holding energy so that heavier switches have to be used than is necessary for holding the magnet. Finally magnetic coils operated with alternating current can only be used for a limited frequency range.

Known valves of the type described are normally embedded in thermosetting plastic material which is a complicated and costly method.

An object of the present invention is to provide an improved valve of the type described and to remove or reduce the effects of the disadvantages disclosed hereinbefore.

According to the invention, an electro-magnetic valve of the kind described includes a gasket of which the apertures therein are so arranged that the connections between the ports in said wall of the housing and the ports in the plate are interchangeable by inverting the gasket. In this way the valve may easily be adapted to provide an opposite function.

Preferably, a further port in said wall of the housing constitutes said outlet from the housing chamber and is connected with a further port in the plate through apertures in said gasket one of the latter apertures being registrable with both said further ports in both positions of the gasket.

In a preferred embodiment of the electro-magnetic valve, the electro-magnet includes an armature enclosed in the chamber in the housing and formed by a spring-loaded arm which carries a valve disc on each side of its free end for closing one or other of the passages in the chamber, the passages having openings in opposite walls of said chamber.

It is an advantage to arrange a rectifier circuit within the housing and having terminals whereby a coil of the electro-magnet may be energized by either a direct or an alternating current supply.

Conveniently, the housing comprises a first part formed as a bottom plate, forming the aforesaid wall, a second part containing the coil of the electro-magnet, and a third part containing the rectifier circuit, the chamber being formed between the first and second parts of the housing.

It is additionally preferred to make the housing of a thermoplastics material and to use a sealing element between metal parts of the valve and the housing.

An embodiment of the invention is now described by way of example with reference to the accompanying drawings, in which.

Figure 1:
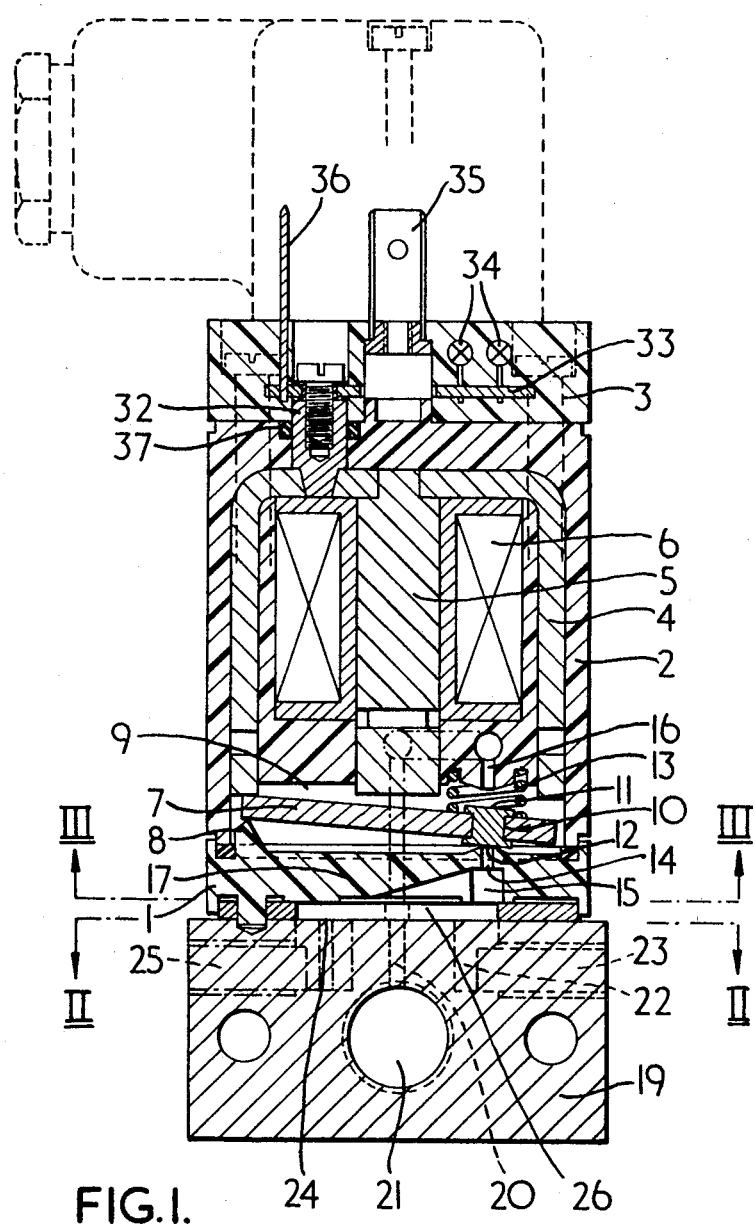
FIG. 1 is a vertical cross Section of an electromagnetic valve according to the invention.
Figure 2:
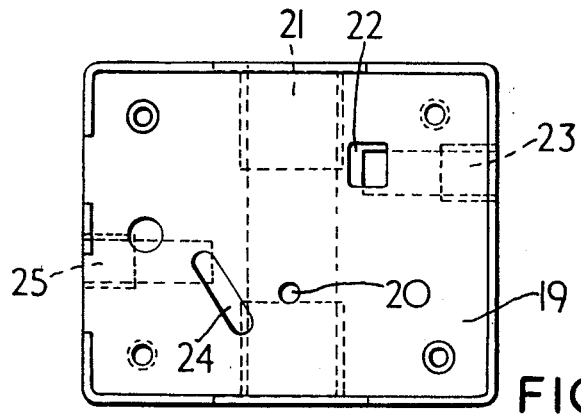
FIG. 2 is a top view of a base plate of the valve as seen from the line II—II in FIG. 1.

With reference to FIG. 1, the valve comprises a housing made of a thermoplastics material and having a bottom plate 1, a middle part 2 and an upper part 3. The middle part 2 contains a magnetic coil of which the magnet comprises a yoke 4 and a central core 5 both made of soft magnetic iron. The legs of the yoke 4 form a first magnetic pole, whereas the central core forms the complementary magnetic pole. The coil winding 6 is wound on a tubular former which is fitted over the core 5. The magnetic coil is also provided with an armature formed by a soft magnetic iron strip 7 which is pivotally held between the lower end of the left leg of the yoke 4 and a rib 8 formed on the bottom plates 1 of the housing. The armature 7 is freely pivotable in a central chamber 9 located between the bottom plate 1 and the middle part 2 of the housing. A plug 10 of an elastomeric material is fitted into a bore in the free end of the armature 7. The end surfaces of the plug 10 form an upper valve disc 11 and a lower valve disc 12 respectively. The armature 7 is loaded by a spring 13 in such manner that when the coil is not energized the lower valve disc 12 closes a passage 14 which connects the central chamber 9 with a port opening 15 in the bottom plate 1 of the housing.

When the magnetic coil is energized the armature 7 pivots upwardly, so that a passage 16 in the middle part 2 of the housing is closed by the upper valve disc 11.

Figure 3:
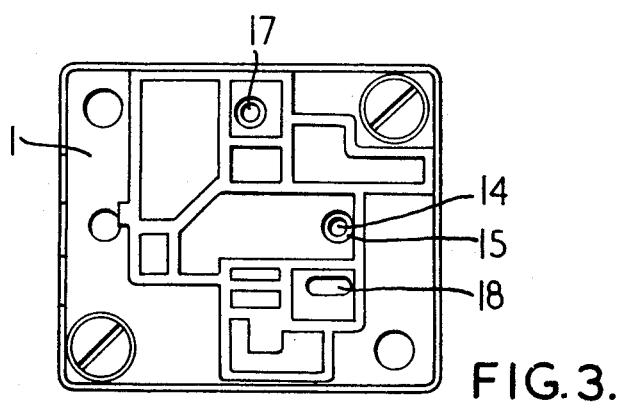
FIG. 3 is a bottom view of a housing of the valve as seen from the line III—III in FIG. 1.

The passage 16 connects the central chamber 9 with a second port opening 17 in the bottom plate 1 of the housing. The central chamber 9 is further connected with an outlet port 18 (See FIG. 3) in the bottom plate of the housing by means of a passage which is not shown in the drawings.

The valve further comprises a base plate 19. The upper surface of the base plate 19 has an inlet port 20 therein connected with a bore 21 for connection to a source of compressed air. The upper surface of the base plate also has an outlet port 22 connected with a bore 23 leading to an external position to which a compressed air signal or supply is to be applied, and an exhaust port 24 which is normally connected with atmosphere through the bore 25. The aforesaid gasket 26 is placed between the lower surface of the bottom plate 1 of the housing and the base plate 19. The housing is mounted on the base plate by means of screws so that the gasket lies compressed between the housing and the base plate 19. The gasket 26 has a plurality of apertures 27 to 31 and may be placed between the housing and the base plate in two different positions.

Figure 4:
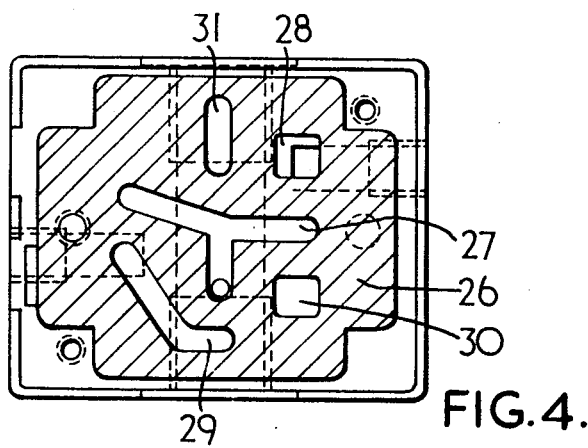
FIG. 4 is a top view of the base plate with a gasket thereon.
Figure 6:
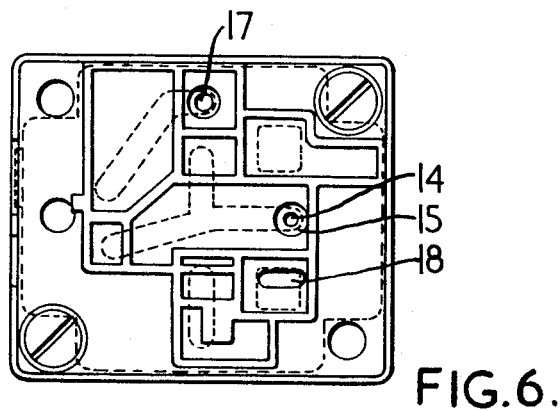
FIG. 6 is a bottom view of the housing in which the gasket is represented in broken lines.

If the gasket 26 is positioned in the way shown in FIGS. 4 and 6, the inlet port 20 is connected with the port opening 15 of the bottom plate 1 through the aperture 27 of the gasket, whereas the outlet port 22 is connected through the aperture 28 with the outlet port 18 of the housing, and the exhaust port 24 of the base plate is connected through the aperture 29 with the port opening 17 of the housing. When the magnetic coil is not energized, the passage 14 is closed by the lower valve disc 12 so that no compressed air is supplied to the central chamber 9, and said external position is connected with atmosphere through the bore 23, the port opening 22, the aperture 28, the port opening 18, the central chamber 9, the passage 16, the port opening 17, the aperture 29, the exhaust port 24 and the bore 25. When the magnetic coil is energized, the upper valve disc 11 closes the passage 16 to disconnect the central chamber 9 from atmosphere. At the same time, the passage 14 is opened to supply compressed air to said external position through the bore 21, the inlet port 20, the aperture 27, the port opening 15, the passage 14, the central chamber 9, the outlet port 18, the aperture 28, the outlet port 22 and the bore 23. In this way, compressed air is supplied through the bore 23 only when the magnetic coil is energized, whereas the bore 23 is connected with atmosphere when the magnetic coil is not energized.

Figure 5:
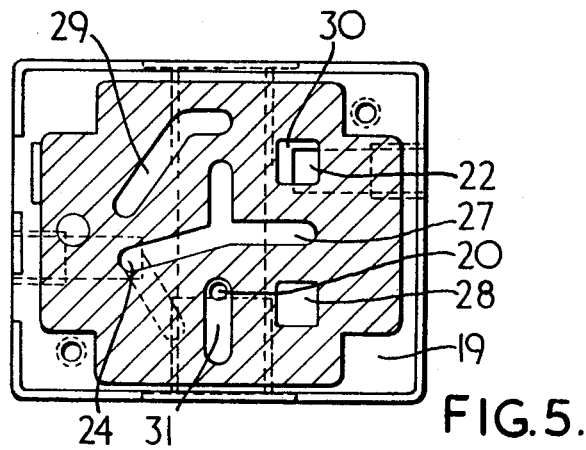
FIG. 5 is a top view of the base plate with the gasket thereon after the gasket has been inverted from the position shown in FIG. 4.
Figure 7:
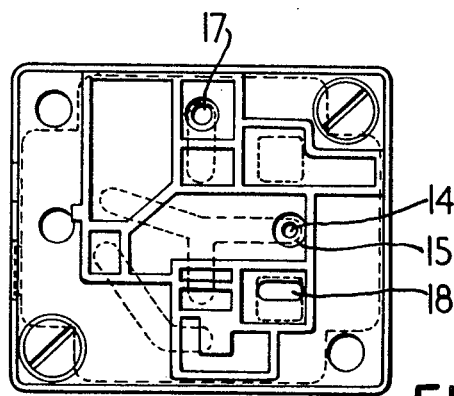
FIG. 7 is a bottom view of the housing in which the gasket is shown in broken lines after its inversion to the position shown in FIG. 5.

If the gasket is inverted, as shown in FIGS. 5 and 7 the inlet port 20 of the base plate 19 is connected through the aperture 31 with the port opening 17 of the housing. At the same time, the exhaust port 24 is connected through the aperture 27 with the port opening 15, and the outlet port 22 is connected through the aperture 30 with the outlet port 18. When the magnetic coil is not energized the lower valve disc 12 of the armature 7 closes the passage 14 to disconnect the central chamber 9 from atmosphere. The passage 16 is opened so that compressed air is supplied to the central chamber via the port opening 17, the aperture 31, the inlet port 20 and the bore 21. The central chamber is permanently connected with the bore 23 so that compressed air is supplied through the bore 23 when the magnetic coil is not energized. If the magnetic coil is energized, the passage 14 is opened to connect the central chamber 9 with atmosphere via the port opening 15, the aperture 27 and the exhaust port 24 of the base plate 19. At the same time, the upper valve disc 11 closes the passage 16 to shut off the supply of compressed air to the central chamber 9. In this way, the bore 23 is only supplied with compressed air when the magnetic coil is not energized.

The supply leads of the magnetic coil are connected with a printed circuit board 33 in the upper part 3 of the housing by means of connecting elements 32 which project into the upper part 3 of the housing. The printed circuit board 33 arranged within the upper part 3 of the housing carries a rectifier bridge circuit comprising four silicon diodes 34. The rectifier circuit is connected with contact pins 35 projecting through the top of the upper part of the housing. In this way, the magnetic coil is always operated with direct current whether the valve is supplied with direct or with alternating current, so that the disadvantages of a magnetic coil operated with alternating current have been removed. Although a ground or "earth" connection is not essential the valve has a ground or earth contact pin 36 by which such a connection can be made if required by regulations. The printed circuit board 33, the diodes 34 and the contact pins 35 and 36 are embedded in a thermoplastics body forming the upper part 3 of the housing. The magnetic coil is embedded in the middle part 2 of the housing in a similar way. Because a thermoplastics material does not provide an hermetic seal with the metal parts of the valve, sealing rings 37 are fitted on the connecting elements 32 so that compressed air cannot escape from the central chamber 9 along the legs of the yoke 4 and the connecting elements 32.

What I claim as my invention and desire to secure by Letters Patent of the United States is:

1. An electromagnetic valve comprising a housing defining a chamber permanently connected with an outlet for delivering a pressurized fluid supply or transmitting a fluid pressure signal to an external position, the chamber also being connected with two ports in a wall of the housing through passages arranged to be alternatively opened and closed, an electro-magnet positioned within the housing to effect said alternative opening and closing of said passages, a plate abutting said wall of the housing and having an inlet and an exhaust port therein and a gasket positioned between the plate and said wall of the housing and having a plurality of apertures therein by which each of the ports in the housing is connected with one or other of the ports in the plate, the apertures in the gasket arranged to interchange the connections between the ports in said wall of the housing and the ports in the plate by inversion of said gasket.

2. An electromagnetic valve according to claim 1 in which a further port in said wall of the housing constitutes said outlet from the housing chamber and is connected with a further port in the plate through apertures in said gasket one of the latter apertures being registrable with both said further ports in both positions of the gasket.

3. An electromagnetic valve according to claim 1, in which said electro-magnet includes an armature enclosed in the chamber in the housing and formed by a spring-loaded arm and a valve disc carried by said arm on each side of its free end for closing one or other of the passages in the chamber, the passages having openings in opposite walls of said chamber.

4. An electromagnetic valve according to claim 1 and including a rectifier circuit arranged within the housing and having terminals to which a coil of the electro-magnet may be connected where the electricity supply thereto is an alternating current supply.

5. An electromagnetic valve according to claim 3, in which said housing comprises a first part being formed as a bottom plate, forming the aforesaid wall, a second part containing the coil of the electro-magnet and a third part containing the rectifier circuit, the chamber being formed between the first and second parts of said housing.

6. An electromagnetic valve according to claim 1, in which said housing is made of a thermoplastics material, a sealing element being provided between metal parts of the valve and said housing.

* * * * *